July 21, 1931. J. GOLDSTEIN 1,815,101
BAIT BOX
Filed Jan. 22, 1931
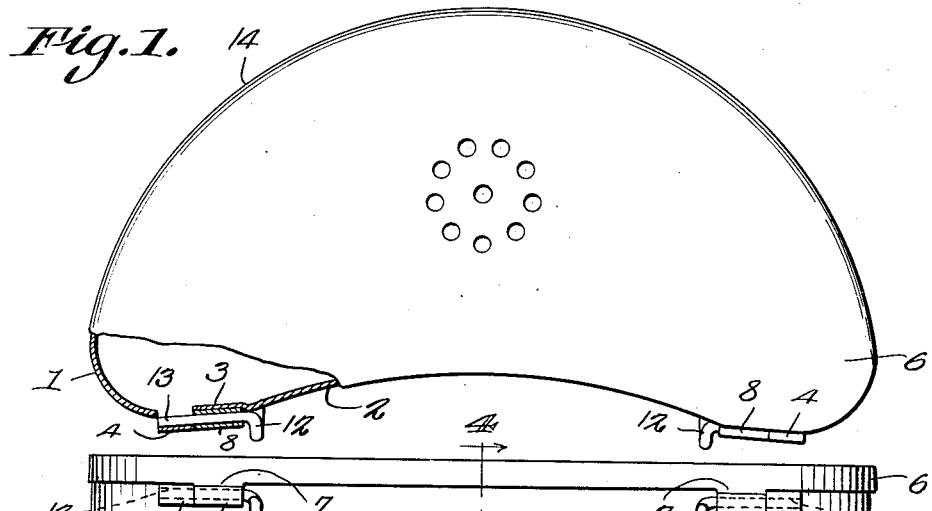
Fig.1.
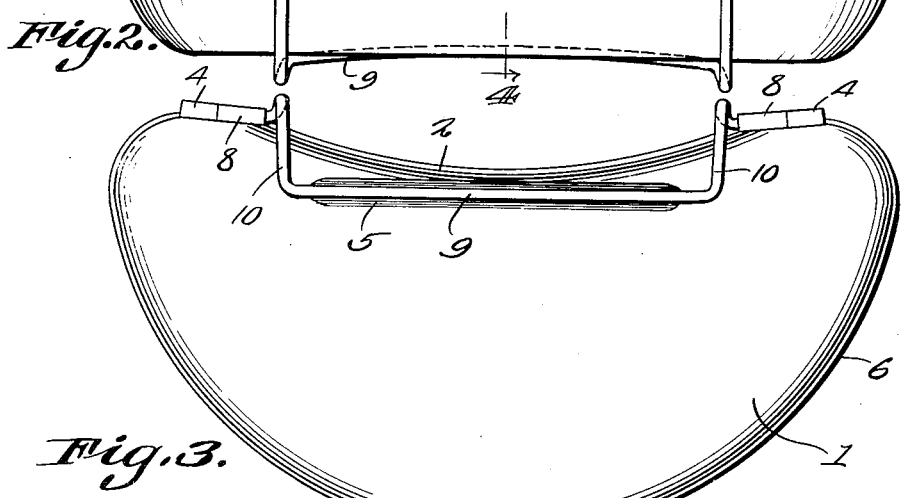
Fig.2.
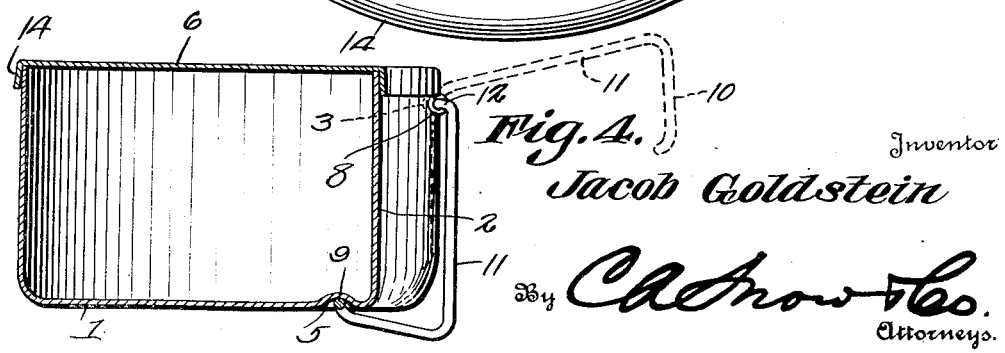
Fig.3.
Fig.4.
Inventor
Jacob Goldstein
By C. A. Snow & Co.
Attorneys.

Patented July 21, 1931

1,815,101

UNITED STATES PATENT OFFICE

JACOB GOLDSTEIN, OF WILKES-BARRE, PENNSYLVANIA

BAIT BOX

Application filed January 22, 1931. Serial No. 510,547.

This invention relates to a bait box, one of the objects being to provide a simple and inexpensive device of that type adapted to be carried on the belt of the user.

A further object is to provide a bait box utilizing a combined hinge member and clip whereby the cover is connected to the body of the box, and the box, in turn, detachably and securely held to a belt or the like.

An other object is to provide a bait box the body and cover of which can be drawn or stamped from sheet metal, thereby expediting and reducing the cost of construction.

A still further object is to provide a hinge which will cause the cover to bind firmly upon the body when closed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings the preferred form of the invention has been shown.

In said drawings:

Figure 1 is a plan view of the bait box, a portion being shown in section.

Figure 2 is a rear elevation.

Figure 3 is a bottom plan view.

Figure 4 is a section on line 4—4, Figure 2.

Referring to the figures by characters of reference, 1 designates the body of the bait box which, as before stated, can be stamped or drawn from sheet metal. It is substantially crescent shaped with rounded ends, a flat bottom and an open top. Adjacent to the ends of the back or concave portion 2 of the box are formed alining depressions or recesses 3 and at one end of each of the recesses 3 there is an outstruck strap 4 constituting a portion of the hinge.

In the bottom of the bait box adjacent to the concave wall 2 is formed a groove 5.

The lid 6 is also formed of sheet metal stamped or drawn to proper shape so as to fit snugly on the open top of the box 1. This lid is shaped to conform with the contour of the box and is provided near its ends with integral tongues 7 which are curled to provide small sleeves 8 adapted to fit in the recesses or depressions 3 and to abut against the adjacent ends of the straps 4.

The third member of the device comprises a length of spring wire bent to form an intermediate arcuate portion 9 having offset ends 10 which merge into diverging arms 11. Each of these arms has a finger 12 substantially parallel with the offset portion 10 and from each finger there is extended a terminal portion 13 constituting a pintle. The two pintles are extended in opposite directions and after the cover and body of the box have been properly assembled the arms 11 are pressed toward each other so that the pintles can be inserted between the sleeves 8. The pintles are then pressed into these sleeves and back of the straps 4 so as to properly join the cover to the body.

The cover 6 can be opened and closed in the usual way, the pintles 13 permitting this relative movement. After the pintles engage sleeves 8 in the lower ends of the tongues 7, said tongues act as springs to pull the front flange 14 of the cover back against the adjoining wall of the body 1 so that it will grip it frictionally and hold the cover against accidental opening.

The arms 11, arcuate portion 9, and other parts integral therewith cooperate to form a clip which can be swung away from the body 1. This clip can then be inserted downwardly back of a supporting belt or the like after which it can be swung toward the body 1 so as to move the arcuate portion 9 under the box and cause it to snap into the groove 5. Consequently the bait box will be held securely to the belt.

Importance is attached to the fact that the bait box can be applied to or removed from a belt or the like without removing or unfastening the belt. Another important feature is found in the fact that the attaching clip and the hinge pintles are formed in one piece.

What is claimed is:

1. A bait box including a body, a lid, and a clip having integral pintles hingedly connecting the lid and body, said clip constituting means for engaging the bottom of the body to hold said body to a supporting belt or the like.

2. A bait box including a body having integral hinge members, a lid having integral hinge members, and a support-engaging clip detachably engaging the bottom of the body and having terminal pintles engaging and joining the hinge members and the body and cover.

3. A bait box including a body having a groove in the bottom thereof, hinge members integral with the body, a cover for the body, hinge members integral therewith, a resilient support-engaging clip, and pintles integral with the clip for engaging and joining said hinge members, said clip having an intermediate portion for snap engagement with the grooved bottom of the body.

4. A bait box including a body, a cover therefor, a resilient support-embracing clip for detachably engaging the bottom of the body, and means integral with the clip for hingedly connecting the body and cover.

In testimony that I claim the foregoing as my own, I have hereto affixed my signature.

JACOB GOLDSTEIN.